US011558721B2

(12) United States Patent
Choi et al.

(10) Patent No.: US 11,558,721 B2
(45) Date of Patent: Jan. 17, 2023

(54) METHOD AND SYSTEM FOR FAIRLY CHARGING TALK TIME OF VIDEO CALL THAT INTRODUCES NEW PERSON

(71) Applicant: LINE Plus Corporation, Seongnam-si (KR)

(72) Inventors: Ji Seon Choi, Seongnam-si (KR); Donggun Yoo, Seongnam-si (KR)

(73) Assignee: Line Plus Corporation, Gyeonggi-do (KR)

( * ) Notice: Subject to any disclaimer, the term of this patent is extended or adjusted under 35 U.S.C. 154(b) by 274 days.

(21) Appl. No.: 17/078,662

(22) Filed: Oct. 23, 2020

(65) Prior Publication Data

US 2021/0127239 A1   Apr. 29, 2021

(30) Foreign Application Priority Data

Oct. 29, 2019   (KR) .......................... 10-2019-0135193

(51) Int. Cl.
| | |
|---|---|
| *H04W 4/00* | (2018.01) |
| *H04W 4/24* | (2018.01) |
| *H04N 7/14* | (2006.01) |
| *H04M 15/00* | (2006.01) |

(52) U.S. Cl.
CPC ............. *H04W 4/24* (2013.01); *H04M 15/41* (2013.01); *H04M 15/66* (2013.01); *H04M 15/72* (2013.01); *H04M 15/83* (2013.01); *H04N 7/147* (2013.01); *H04M 2215/018* (2013.01); *H04M 2215/0168* (2013.01); *H04M 2215/0188* (2013.01); *H04M 2215/7485* (2013.01); *H04M 2215/78* (2013.01)

(58) Field of Classification Search
CPC ....... H04W 4/24; H04M 15/41; H04M 15/66; H04M 15/72; H04M 15/83; H04N 7/147
See application file for complete search history.

(56) References Cited

U.S. PATENT DOCUMENTS

| | | | |
|---|---|---|---|
| 9,094,954 B2 * | 7/2015 | Mun | .................. H04M 1/72433 |
| 10,715,762 B2 * | 7/2020 | Lee | ...................... G06F 3/04817 |
| 2019/0297301 A1 * | 9/2019 | Ahn | ........................ G06V 40/28 |
| 2021/0192528 A1 * | 6/2021 | Zhao | .................... G06Q 20/326 |

\* cited by examiner

*Primary Examiner* — Pakee Fang
(74) *Attorney, Agent, or Firm* — Harness, Dickey & Pierce, P.L.C.

(57) ABSTRACT

A computer-implemented billing method including displaying, on a video call screen, video data related to a counterpart terminal with which a video call is connected, recognizing reaction information input from the counterpart terminal based on the video data related to the counterpart terminal displayed on the video call screen, and generating billing data related to the recognized reaction information of the counterpart terminal based on a billing policy may be provided.

16 Claims, 8 Drawing Sheets

METHOD AND SYSTEM FOR FAIRLY CHARGING TALK TIME OF VIDEO CALL THAT INTRODUCES NEW PERSON

CROSS-REFERENCE TO RELATED APPLICATION(S)

This U.S. non-provisional application claims the benefit of priority under 35 U.S.C. § 119 to Korean Patent Application No. 10-2019-0135193, filed Oct. 29, 2019, the entire contents of which are incorporated herein by reference in their entirety.

BACKGROUND

Technical Field

One or more example embodiments relate to technology for charging based on a duration of time (e.g., actual talk time) of a video call.

Related Art

With the developments in communication technology, a video call service is provided to large electronic devices, such as a television, as well as portable communication devices, such as a mobile phone. In response to a call attempt for a video call from a calling terminal, a call attempt message is transmitted to an exchanger through a base station and/or a base station controller and the exchanger acquires routing information to a receiving terminal through a home location register and establishes a session with the receiving terminal through a receiving-side exchanger. Through this process, a user of the calling terminal and a user of the receiving terminal may have a video call while viewing each other's faces by transmitting and receiving audio and video.

An increasing number of users could meet a new person through an application that provides a meeting online. In the case of having a video call to meet a new person online, a user is generally charged based on a duration of time of a call. However, although there is no response from a counterpart user during a video call, the same billing policy, that is, charging based on a duration of time of a call may apply. Therefore, users to be charged may perceive unfair.

SUMMARY

Some example embodiments provide methods and/or systems that may perform fair billing based on a duration of time of a video call that introduces a new person.

Some example embodiments provide methods and/or systems that may suspend generation of billing data based on reaction information of a counterpart terminal recognized during a video call.

According to an aspect of at least one example embodiment, a computer-implemented billing method may include displaying, on a video call screen, video data related to a counterpart terminal with which a video call is connected, recognizing reaction information input from the counterpart terminal based on the video data related to the counterpart terminal displayed on the video call screen, and generating billing data related to the recognized reaction information of the counterpart terminal based on a billing policy.

The generating the billing data may include setting the billing policy for assigning the billing data based on the reaction information of the counterpart terminal.

The generating the billing data may include suspending generation of the billing data that is assigned based on the set billing policy, in response to absence of the reaction information input from the counterpart terminal or in response to the reaction information being recognized for less than a duration of time.

The generating the billing data may include counting a duration of time during which the reaction information of the counterpart terminal is recognized and generating or suspending generation of the billing data related to the counted duration of time based on the set billing policy.

The recognizing may include determining whether the reaction information of the counterpart terminal is recognized based on at least one of facial information of a counterpart user, voice data of the counterpart user, and text data of the counterpart user recognized from the video data related to the counterpart terminal displayed on the video call screen.

The recognizing may include performing a voice recognition for the voice data of the counterpart user in response to a facial recognition being absent in the facial information of the counterpart user during a first duration of time, performing a text input recognition for the text data of the counterpart user in response to the voice recognition being absent in the voice data of the counterpart user during a second duration of time, and determining that the reaction information of the counterpart terminal is absent in response to the text input recognition being absent in the text data of the counterpart user during a third duration of time.

The recognizing may include determining that reaction information to the facial information of the counterpart user is recognized based on ratio information of area information that includes components constituting the facial information of the counterpart user.

The recognizing may include identifying the voice data of the counterpart user from voice data occurring during the video call and recognizing that reaction information to the voice data of the counterpart user is input based on results of the identifying.

The recognizing may include displaying a user interface of inputting a message on the video call screen and recognizing that the text data of the counterpart user is input based on the message input through the user interface.

The generating of the billing data may include determining that the reaction information of the counterpart terminal is not recognized and suspending generation of the billing data, in response to reaction information of a user of a terminal displayed on the video call screen being recognized and the reaction information of the counterpart terminal displayed on the video call screen being not recognized.

The displaying may include displaying, on the video call screen, the video data related to the counterpart terminal with which the video call is connected during a desired duration of time, in response to a connection of the video call with the counterpart terminal being retrieved in response to a request for connecting the video call.

The displaying may include controlling a duration of time of the video call with the counterpart terminal using an item during the video call in response to verifying a counterpart user of the counterpart terminal connected through the video call.

The generating may include counting an actual talk time during which the video call with the counterpart terminal is connected based on result information, which has been acquired by performing a recognition of reaction information of the counterpart terminal during an additional time of the video call set by using an item on the video call screen.

The displaying may include operating a video call mode in response to a connection of the video call with the counterpart terminal and displaying the video data related to the counterpart terminal on the video call screen based on the video call mode.

The generating may include terminating the video call screen in response to the video call mode that operates in response to a connection of the video call with the counterpart terminal is switched to a voice mode and suspending generation of the billing data based on time information about a time at which the video call mode is switched to the voice mode.

According to an aspect of at least one example embodiment, there is provided a non-transitory computer-readable record medium storing instructions that, when executed by a processor, cause the processor to perform the billing method.

According to an aspect of at least one example embodiment, a computer-implemented billing system may include a memory configured to store computer-readable instructions and one or more processors configured to execute the computer-readable instructions such that the one or more processors are configured to display, on a video call screen, video data related to a counterpart terminal with which a video call is connected, recognize reaction information input from the counterpart terminal based on the video data related to the counterpart terminal displayed on the video call screen, and generate billing data related to the recognized reaction information of the counterpart terminal based on a billing policy.

The one or more processors may be further configured to set the billing policy for assigning the billing data based on the reaction information of the counterpart terminal, and suspend generation of the billing data that is assigned based on the billing policy in response to absence of the reaction information input from the counterpart terminal or in response to the reaction information being recognized for less than a preset duration of time.

The one or more processors may be further configured to determine whether the reaction information of the counterpart terminal is recognized based on at least one of facial information of a counterpart user, voice data of the counterpart user, and text data of the counterpart user recognized from the video data related to the counterpart terminal displayed on the video call screen.

The one or more processors may be further configured to control a duration of time of the video call with the counterpart terminal using an item during the video call in response to verifying a counterpart user of the counterpart terminal connected through the video call, and count an actual talk time during which the video call with the counterpart terminal is connected based on result information, which has been acquired by performing a recognition of reaction information of the counterpart terminal during an additional time of the video call set by using the item on the video call screen.

According to some example embodiments, it is possible to perform fair billing based on a duration of time during which a video call substantially or actually occurs by recognizing reaction information of a counterpart terminal based on video data related to the counterpart terminal that is displayed on a video call screen.

According to some example embodiments, it is possible to enhance a user satisfaction by generating or suspending generation of billing data in response to recognition or non-recognition of reaction information of a counterpart terminal with a video call is connected.

Further areas of applicability will become apparent from the description provided herein. The description and specific examples in this summary are intended for purposes of illustration only and are not intended to limit the scope of the present disclosure.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device. However, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Figure 1:
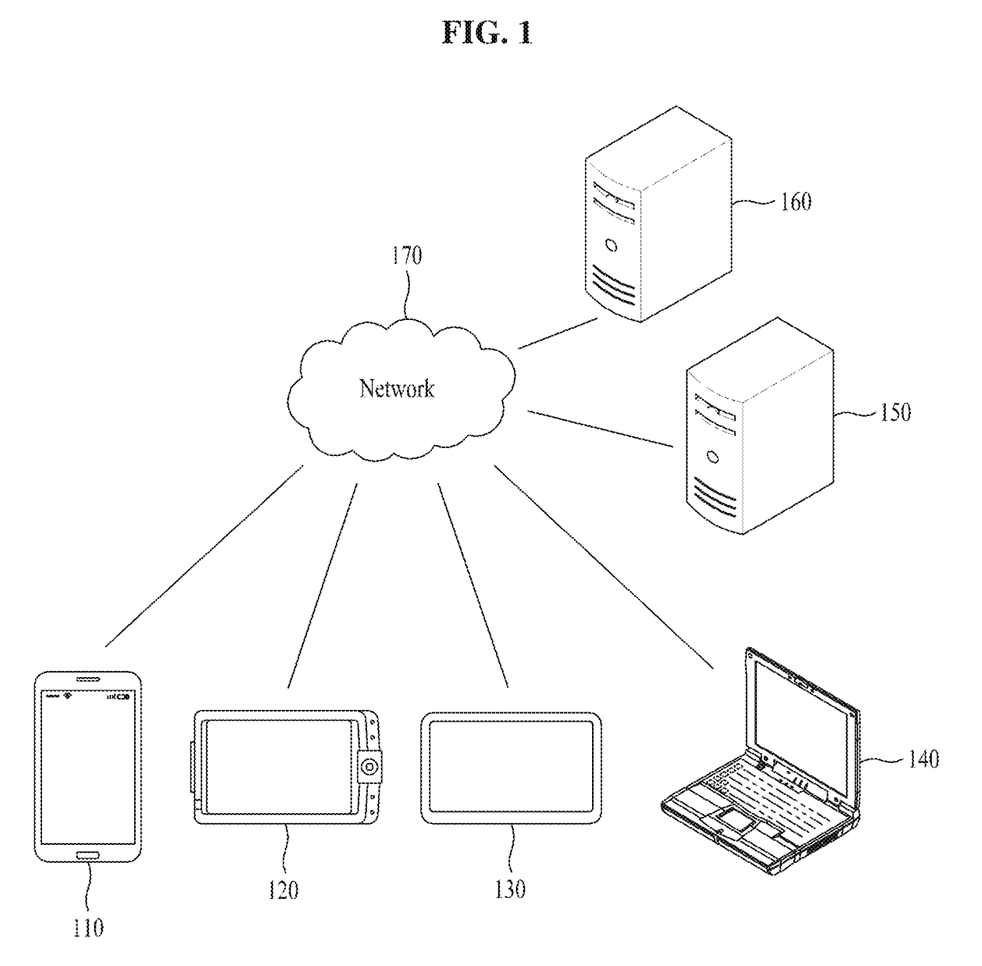
FIG. 1 is a diagram illustrating an example of a network environment according to at least one example embodiment.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In some example embodiments, the server 150 may provide, as the first service, a service (e.g., a messaging service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
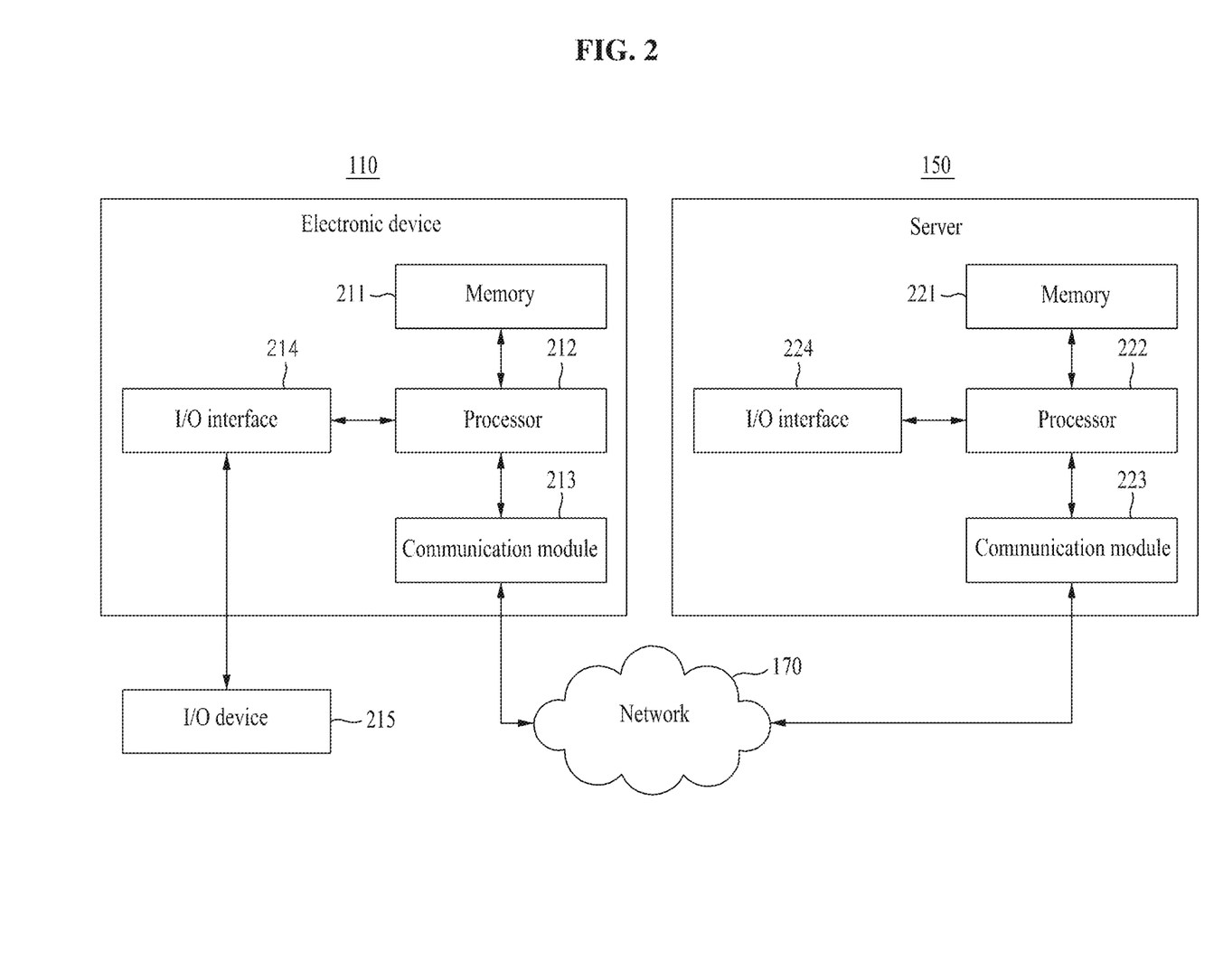
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS and at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program (e.g., the application) installed by files provided over the network 170 from developers or a file distribution system (e.g., the server 160) that provides an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O device 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O device 215 may be configured as a single device with the electronic device 110. Also, the I/O interface 224 of the server 150 may be a device for interface with an apparatus (not shown) for input or output that may be connected to the server 150 or included in the server 150. In some example embodiments, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a number of components greater than or less than a number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a variety of sensors, a database (DB), and the like. In some example embodiments, if the electronic device 110 is a smartphone, the electronic device 110 may be configured to further include a variety of components, for example, an acceleration sensor, a gyro sensor, a camera module, various physical buttons, a button using a touch panel, an I/O port, and/or a vibrator for vibration, which are generally included in the smartphone.

According to an example embodiment, the electronic device 110 may be configured as a computer-implemented billing system. For example, the billing system may be configured in a form of a program that independently operates or may be configured in an in-app form of a specific application to be operable on the specific application. Depending on cases, the billing system may generate billing data through interaction with the server 150.

Figure 3:
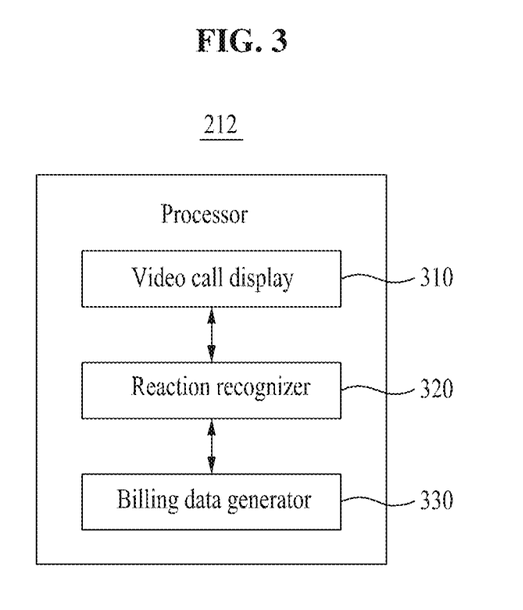
FIG. 3 is a diagram illustrating an example of components includable in a processor of an electronic device according to at least one example embodiment.
Figure 4:
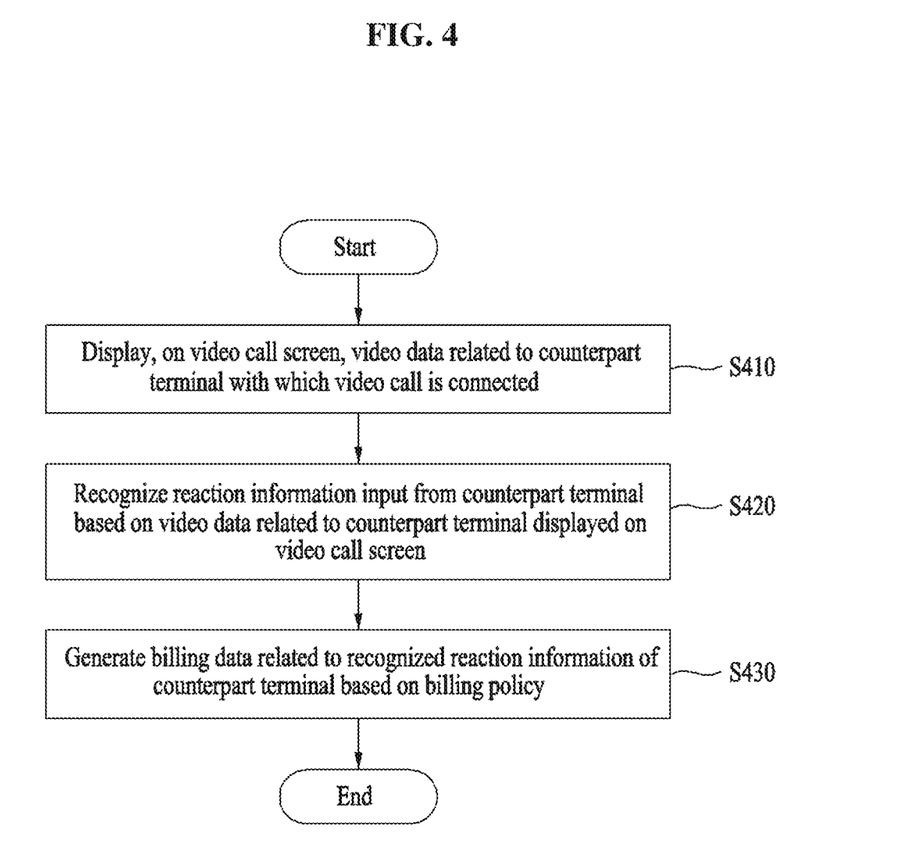
FIG. 4 is a flowchart illustrating an example of a billing method performed by an electronic device according to at least one example embodiment.

FIG. 3 is a diagram illustrating an example of components includable in a processor of an electronic device according to at least one example embodiment, and FIG. 4 is a flowchart illustrating an example of a billing method performed by an electronic device according to at least one example embodiment.

Referring to FIG. 3, the processor 212 of the electronic device 110 may include a video call display 310, a reaction recognizer 320, and a billing data generator 330. The components of the processor 212 may be representations of different functions performed by the processor 212 in response to a control instruction provided from a program code stored in the electronic device 110. The processor 212 and the components of the processor 212 may control the electronic device 110 to perform operations S410 to S430 included in the billing method of FIG. 4. Here, the processor 212 and the components of the processor 212 may be configured to execute an instruction according to a code of at least one program and/or a code of an OS included in the memory 211.

The processor 212 may load, to the memory 211, a program code stored in a file of a program for the billing method. For example, in response to the program executed on the electronic device 110, the processor 212 may control the electronic device 110 to load the program code from a file of a program to the memory 211 under control of the OS. Here, the processor 212 and the video call display 310, the reaction recognizer 320, and the billing data generator 330 included in the processor 212 may be different functional representations of the processor 212 to perform the following operations S410 to S430 by executing an instruction of a portion corresponding to the program code to the memory 211.

Referring to FIG. 4, in operation S410, the video call display 310 may display, on a video call screen, video data related to a counterpart terminal with which a video call is connected. In response to a connection of the video call with the counterpart terminal retrieved in response to a request for connecting the video call, the video call display 310 may display, on the video call screen, the video data related to the counterpart terminal with which the video call is connected during a predetermined (or, alternatively, desired) duration of time. Here, a duration of time during which the video call is connected may be set. For example, the video call display 310 may display a message asking whether to connect the video call with the counterpart terminal retrieved in response to the request for connecting the video call. In response to an input of a response from a user (e.g., a user terminal) regarding whether to connect the video call with the counterpart terminal (interchangeably referred to as "counterpart user terminal"), the video call with the counterpart terminal may be connected or disconnected. If the response is input to disconnect the video call with the counterpart terminal, another counterpart terminal may be retrieved and a video call with the retrieved another counterpart terminal may be connected. Likewise, in response to an input of a response from a counterpart user, that is, a user of the counterpart terminal regarding whether to connect a video call with a terminal, the counterpart terminal may connect or disconnect the video call with the terminal (e.g., "user terminal"). That is, in response to a response to connect the video call from the terminal and the counterpart terminal, the video call between the terminal and the counterpart terminal may be connected during a predetermined (or, alternatively, desired) duration of time. In some example embodiments, a video call mode may operate in response to a connection of the video call with the counterpart terminal and the video call display 310 may display the video date related to the counterpart terminal on the video call screen based on the operating video call mode. For example, a front camera mode for executing a front camera and a rear camera mode for executing a rear camera may be provided to each of the terminal and the counterpart terminal. In response to the connection of the video call, a corresponding terminal may be switched to the video call mode and the front camera mode may be executed. If the counterpart user of the counterpart terminal with which the video call is connected is verified, the video call display 310 may control a duration of time of the video call with the counterpart terminal using an item during the video call.

In operation S420, the reaction recognizer 320 may recognize reaction information input from the counterpart terminal based on the video data related to the counterpart terminal displayed on the video call screen. The reaction recognizer 320 may determine presence or absence of the reaction information of the counterpart terminal that includes at least one of facial information of the counterpart user, voice data of the counterpart user, and text data of the counterpart user recognized from the video data related to the counterpart terminal displayed on the video call screen. For example, the reaction recognizer 320 may perform a voice recognition for the voice data of the counterpart user if a facial recognition is absent in the facial information of the counterpart terminal during a preset (or alternatively, desired) duration of time or more, may perform a text input recognition for the text data of the counterpart user if the voice recognition is absent in the voice data of the counterpart terminal during a preset (or alternatively, desired) duration of time more, and may determine that the reaction information of the counterpart terminal is absent if the text input recognition is absent in the text data of the counterpart user during a preset (or alternatively, desired) duration of time or more.

For example, if reaction information of the user of the terminal displayed on the video call screen is recognized and the reaction information of the counterpart terminal displayed on the video call screen is not recognized, the reaction recognizer 320 may determine that the reaction information of the counterpart terminal is not recognized. For example, if the reaction information of the user of the terminal displayed on the video call screen is not recognized and the reaction information of the counterpart terminal displayed on the video call screen is recognized, the reaction recognizer 320 may determine that the reaction information of the counterpart terminal is recognized. According to example embodiments, various methods may be used to determine that the reaction information of the counterpart terminal are recognized.

Also, if a doll or another user (e.g., a user different from the counterpart user) is recognized as an alternative instead of a face of the counterpart terminal of the counterpart terminal, the reaction recognizer 320 may determine that reaction information of the counterpart user is not recognized. If other voice data aside from the voice data of the counterpart user is determined to be recognized, the reaction recognizer 320 may determine that the reaction information of the counterpart user is not recognized. For example, facial information of the counterpart user may be prestored and the reaction information of the counterpart user may be recognized through comparison between the prestored facial information and facial information input to the video call screen. Likewise, voice information of the counterpart user may be prestored and the reaction information of the counterpart user may be recognized through comparison between the prestored voice information and voice data input during the video call.

In operation S430, the billing data generator 330 may generate billing data related to the recognized reaction information of the counterpart terminal based on a preset (or alternatively, desired) billing policy. If the reaction information input from the counterpart terminal is absent or if the reaction information is recognized for a duration of time less than a preset (or alternatively, desired) duration of time, the billing data generator 330 may suspend generation of the billing data that is assigned based on a set billing policy. The billing data generator 330 may set the billing policy for assigning billing data based on the reaction information of the counterpart terminal and may count the recognized reaction information of the counterpart terminal based on the set billing policy. Here, the billing policy may simply include a policy for determining whether the reaction information of the counterpart terminal is recognized. Further, the billing policy may refer to a policy set to assign billing data by a duration of time during which the video call is performed if the reaction information of the counterpart terminal is recognized. The billing data generator 330 may count a duration of time during which the reaction information of the counterpart terminal is recognized and may generate billing data based on the set billing policy. For example, the billing data generator 330 may count a duration of time during which the video call with the counterpart terminal is connected based on result information acquired by performing recognition of the reaction information of the counterpart terminal, based on information about the duration of time of the video call set to an item used during the video call, and may generate billing data based on the counted duration of time. As another example, if reaction information of the user of the terminal displayed on the video call screen is recognized and the reaction information of the counterpart terminal displayed on the video call screen is not recognized, the billing data generator 330 may determine that the reaction information of the counterpart terminal is not recognized, and may suspend generation of the billing data. In some example embodiments, if the reaction information of the user of the terminal displayed on the video call screen is not recognized and reaction information of the counterpart terminal displayed on the video call screen is recognized, the billing data generator 330 may determine that the reaction information of the counterpart terminal is recognized and may generate the billing data.

Figure 5:
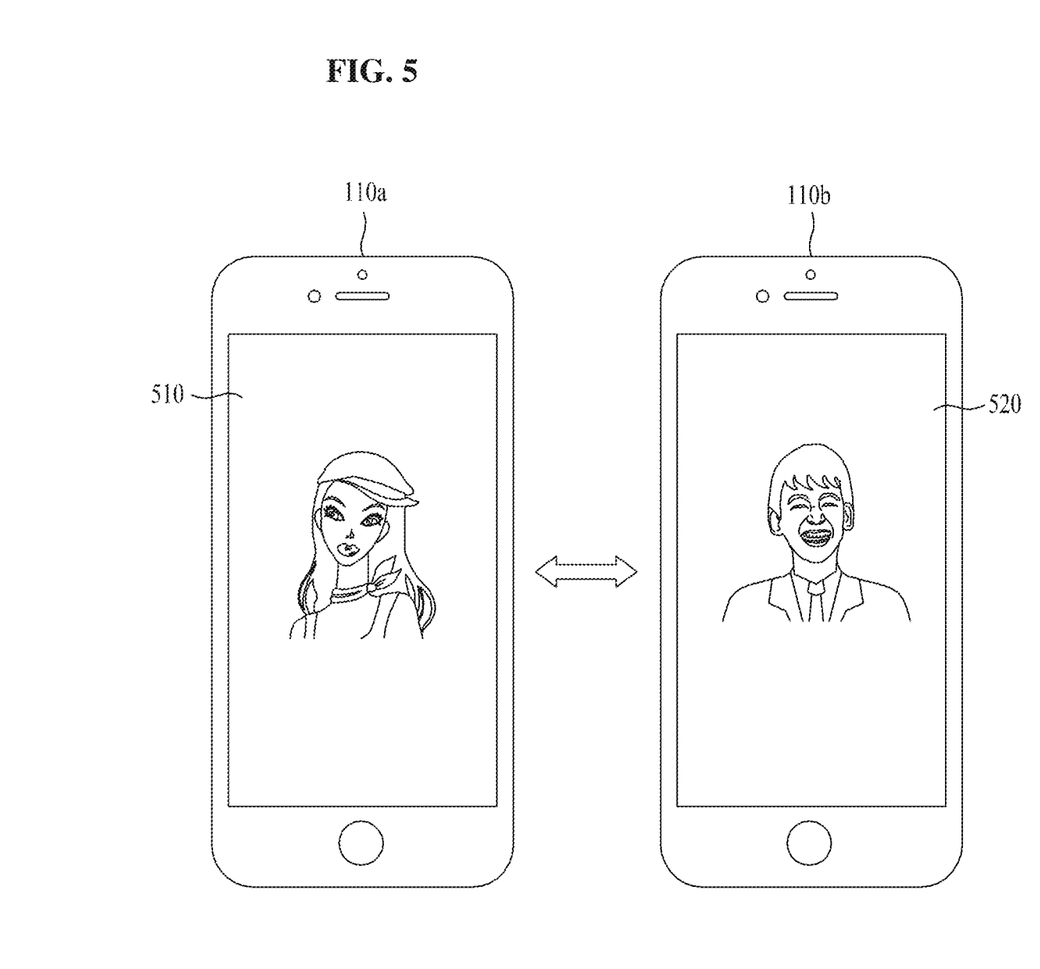
FIG. 5 illustrates an example of having a video call between electronic devices according to at least one example embodiment.

FIG. 5 illustrates an example of having a video call between electronic devices according to at least one example embodiment.

An example of having a video call between electronic devices 110a and 110b is described. Here, description is made by setting the electronic devices 110a and 110b as the first electronic device (e.g., a calling terminal) 110a and the second electronic device (e.g., a receiving terminal) 110b, respectively. A function of providing a video call service may be included in each of the first electronic device 110a and the second electronic device 110b, and the video call service may be used by installing a separate app on each of the first electronic device 110a and the second electronic device 110b. Hereinafter, an example of using the video call service by installing the separate app is described. Here, the app installed on each of the first electronic device 110a and the second electronic device 110b may provide various services as well as the video call service. For example, a friendship promotion service for providing online meetings by matching a user and a counterpart user unaware of the user, and accordingly connecting a video call between the user and the counterpart user is assumed. This friendship promotion service may provide various functions, for example, a video call function, a messaging function, and/or a camera function, for connecting the user with the counterpart user through an online meeting.

For example, when signing up for the friendship promotion service through the respective corresponding electronic devices 110a and 110b, the respective users may subscribe to the friendship promotion service by linking user information through a selection on a separate social network service (SNS), a search service, and the like. In some example embodiments, each user may subscribe to the service by inputting user identification information through a membership registration. Here, gender information stored in a separate service may interact. Also, each user may register gender information by selecting a gender at the friendship promotion service. Also, each user may select condition information that includes a gender, region information (global or domestic), and things of interest of a counterpart user that a corresponding user desires to meet.

The friendship promotion service may be executed on each of the first electronic device 110a and the second electronic device 110b. The first electronic device 110a may request a video call connection. In response to the request for the video call connection from the first electronic device 110a, the server may retrieve a counterpart user from a user account registered to the friendship promotion service based on condition information selected by the first electronic device 110a. A video call may be connected between the first electronic device 110a and the second electronic device 110b corresponding to the counterpart user retrieved by the server. The first electronic device 110a and the second electronic device 110b may perform the video call. Here, a duration of time during which the video call is connected between first electronic device 110a and the second electronic device 110b may be set. If the set duration of time elapses after the video call is connected based on the duration of time set to the first electronic device 110a and the second electronic device 110b, a video call with another counterpart may be connected to each of the first electronic device 110a and the second electronic device 110b.

A user of the second electronic device 110b corresponding to the counterpart user may be displayed on a video call screen 510 of the first electronic device 110a, and the user of the first electronic device 110a may be displayed on a video call screen 520 of the second electronic device 110b.

In this manner, the user of the first electronic device 110a and the user of the second electronic device 110b may have a conversation using at least one of voice data and text data while viewing each other's faces. Also, the face of the user of the first electronic device 110a as well as the face of the counterpart user, that is, the user of the second electronic device 110b may be displayed on the video call screen 510 of the first electronic device 110a. Also, the face of the user of the second electronic device 110b as well as the face of the user of the first electronic device 110a may be displayed on the video call screen 520 of the second electronic device 110b. For example, each of the video call screens 510 and 520 may include an area for displaying a face of a counterpart user and an area for displaying a face of a corresponding user. Here, the area for displaying the face of the counterpart user may be set as a main area and the area for displaying the face of the corresponding user may be set as a subarea. A size of the main area may be set to be greater than a size of the subarea.

Figure 6:
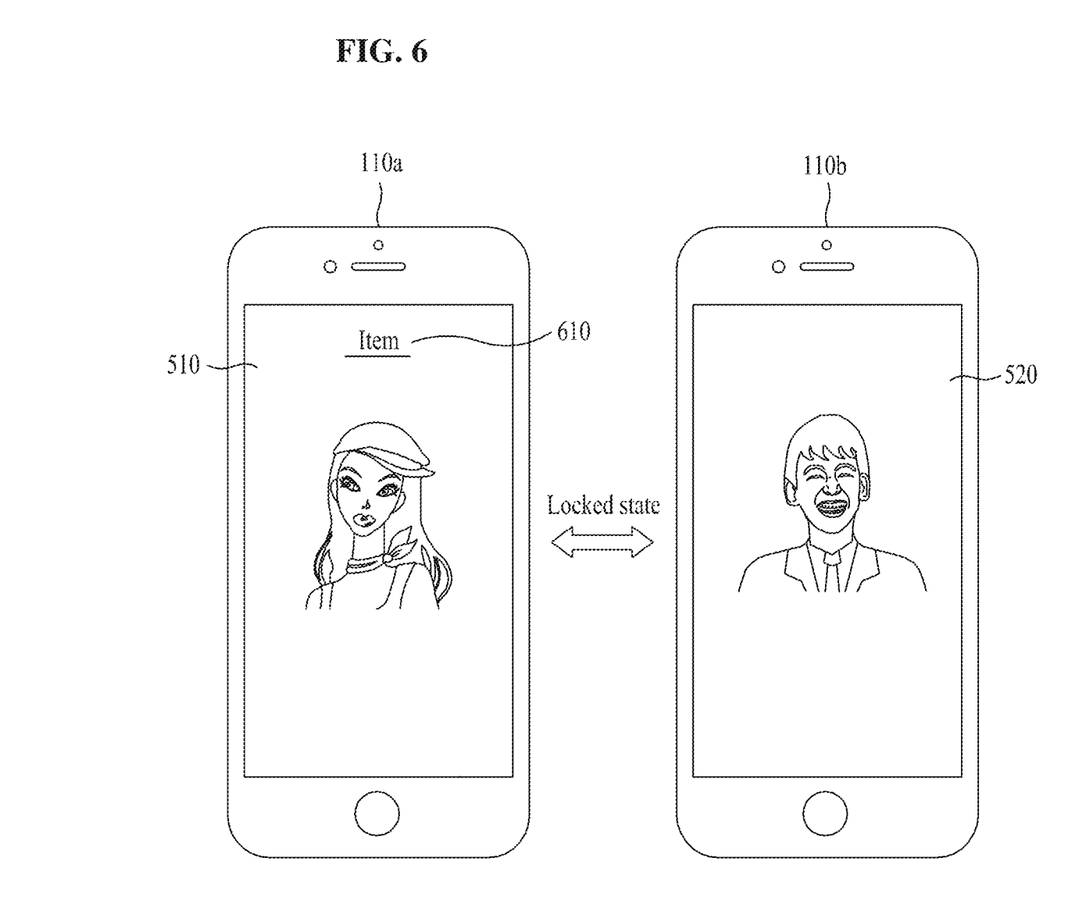
FIG. 6 illustrates an example of using an item at an electronic device according to at least one example embodiment.

FIG. 6 illustrates an example of using an item at an electronic device according to at least one example embodiment.

The user of the first electronic device 110a may verify a counterpart user corresponding to the second electronic device 110b, and may desire to have a video call for a duration of time greater than or equal to a duration of time set for a video call with the second electronic device 110b. The first electronic device 110a may control a duration of time of the video call with the second electronic device 110b using an item 610 during the video call with the counterpart user of the second electronic device 110b. For example, the first electronic device 110a may purchase in advance the item 610 or may purchase the item 610 from item information displayed on the video call screen 510. The item 610 for controlling a duration of time of the video call may refer to an item capable of allowing an additional video call with the counterpart user in addition to a duration of time set at the friendship promotion service and during which a video call between users is performed. Here, an amount of the item 610 may vary depending on a duration of time available for the video call. If the user of the first electronic device 110a uses the item 610, the counterpart user of the second electronic device 110b may not suspend the video call and need to additionally have the video call during the duration of time of the video call set by the item 610 of the user. That is, the video call screen 520 of the second electronic device 110b may be switched to a locked state and the first electronic device 110a may control the duration of time of the video call with the second electronic device 110b during the duration of time set by the item 610 used at the first electronic device 110a.

The first electronic device 110a may perform recognition of reaction information of the second electronic device 110b based on information about the duration of time of the video call set by the item 610 that is used during the video call. The first electronic device 110a may determine whether reaction information of the second electronic device 110b is recognized based on at least one of facial information of the counterpart user, voice data of the counterpart user, and text data of the counterpart user recognized from video data related to the second electronic device 110b displayed on the video call screen 510. The first electronic device 110a may count a duration of time (e.g., actual talk time) during which the video call with the second electronic device 110b is connected based on result information acquired by performing the recognition of the reaction information of the second electronic device 110b. In other words, the first electronic device 110*a* may count an actual talk time during which the video call with the counterpart terminal is connected based on result information, which has been acquired by performing a recognition of the reaction information of the counterpart terminal during an additional time of the video call set by using an item on the video call screen 510. For example, if the first electronic device 110*a* uses a 5-second item during the video call with the second electronic device 110*b*, an additional video call may be performed during 5 seconds in addition to a duration of time set for the video call. Here, the counterpart user of the second electronic device 110*b* may not suspend a video call with the user of the first electronic device 110*a*, and thus may not respond to the video call screen 520. In this case, a duration of time set using a separately purchased item may be terminated in a state in which the first electronic device 110*a* does not use the separately purchased item sufficiently. If reaction information of the counterpart user of the second electronic device 110*b* is not recognized during a duration of time additionally set by the item 610 (interchangeably, additional duration of time set by the item 610) and used at the first electronic device 110*a*, the first electronic device 110*a* may count a duration of time during which the reaction information of the counterpart user of the second electronic device 110*b* is not recognized. The first electronic device 110*a* may suspend generation of billing data related to the counted duration of time. For example, the first electronic device 110*a* may return the duration of time set by the item 610 as information about the duration of time during which the reaction information of the counterpart user of the second electronic device 110*b* is not recognized, or may additionally assign a duration of time. Thus, with respect to billing data assigned based on a duration of time of the video call, the first electronic device 110*a* may suspend generation of billing data related to information about the duration of time during which the reaction information of the counterpart user of the second electronic device 110*b* is not recognized and may reduce a fee to be charged to the first electronic device 110*a*.

Figure 7:
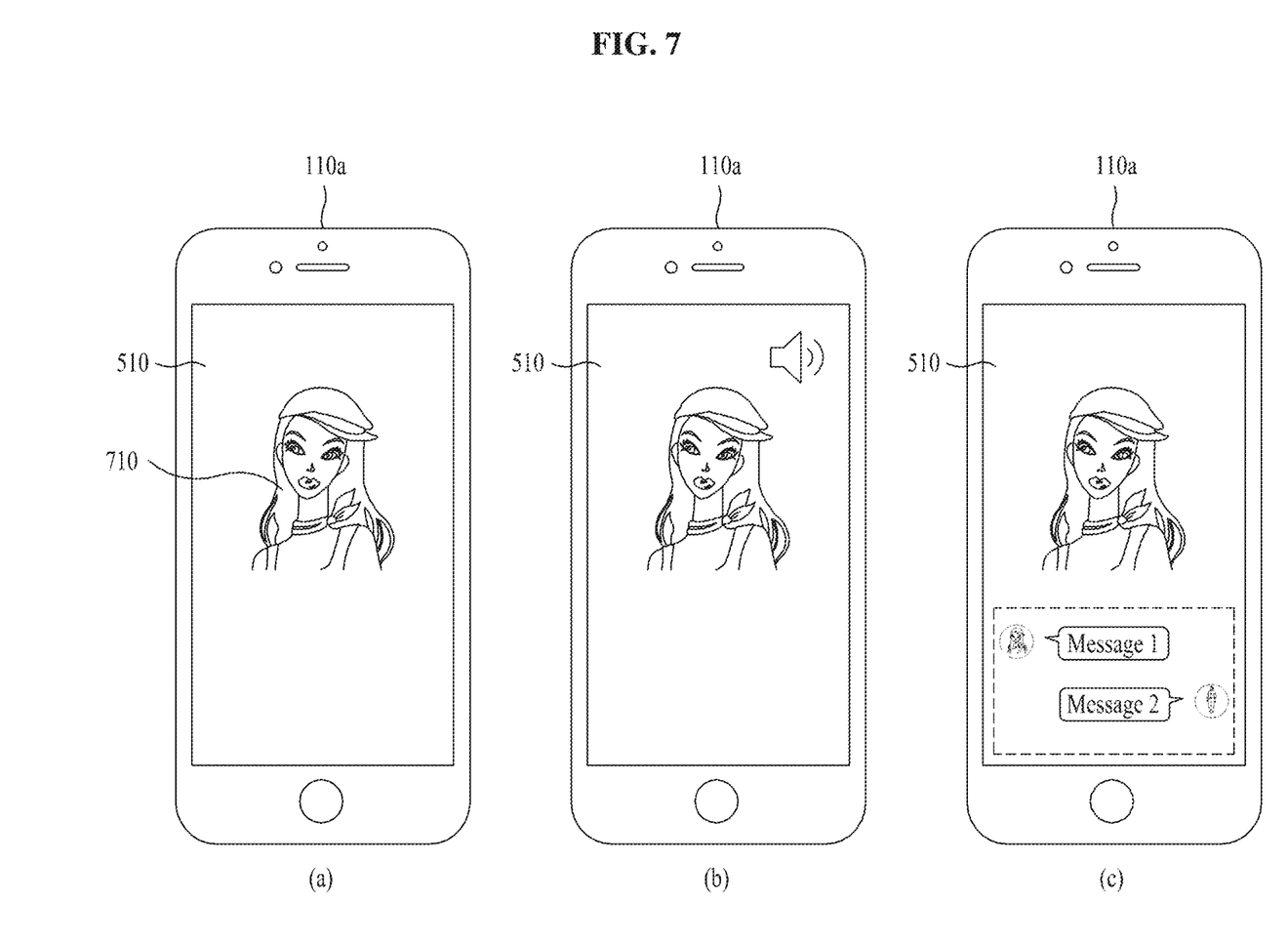
FIG. 7 illustrates an example of recognizing reaction information of a counterpart terminal at an electronic device according to at least one example embodiment.

FIG. 7 illustrates an example of recognizing reaction information of a counterpart terminal at an electronic device according to at least one example embodiment.

The user of the first electronic device 110*a* and a counterpart user, that is, the user of the second electronic device 110*b* may have a conversation while viewing each other's faces respectively displayed on the video call screen 510 and the video call screen 520 during the video call. The first electronic device 110*a* may recognize reaction information input from the second electronic device 110*b* based on video data related to the second electronic device 110*b* displayed on the video call screen 510. Here, the reaction information may refer to information for recognizing an interaction between users during the video call. The first electronic device 110*a* may determine presence or absence of reaction information of the counterpart terminal that includes at least one of facial information of the counterpart user, voice data of the counterpart user, and text data of the counterpart user recognized from video data related to the counterpart terminal displayed on the video call screen 510.

Referring to (a) of FIG. 7, the first electronic device 110*a* may determine whether a counterpart user is present by verifying a counterpart user 710 of the second electronic device 110*b* displayed on the video call screen 510 of the first electronic device 110*a*. For example, the first electronic device 110*a* may recognize a face of the counterpart user 710 of the second electronic device 110*b* displayed on the video call screen 510 of the first electronic device 110*a*.

Here, the first electronic device 110*a* may determine whether reaction information to facial information of the counterpart user 710 of the second electronic device 110*b* is recognized based on ratio information of area information that includes components (e.g., eyes, nose, and lips) constituting the facial information of the counterpart user 710. For example, the first electronic device 110*a* may recognize that the facial information of the counterpart user 710 is present based on the determination that a ratio of area information including a component constituting the facial information of the counterpart user 710 occupies 50% on the video call screen 510. Accordingly, the first electronic device 110*a* may recognize that the reaction information of the counterpart user 710 is input. In some example embodiments, the first electronic device 110*a* may recognize that the facial information of the counterpart user 710 is present based on the determination that at least one component (e.g., eyes, nose, or lip) constituting the facial information of the counterpart user 710 is present on the video call screen 510. The first electronic device 110*a* may recognize that a video call with the counterpart user 710 of the second electronic device 110*b* is ongoing.

Referring to (b) of FIG. 7, the first electronic device 110*a* may determine whether reaction information of a counterpart user is recognized by receiving voice data of the counterpart user of the second electronic device 110*b* during a video call. For example, the counterpart user of the second electronic device 110*b* is not displayed on the video call screen 510 of the first electronic device 110*a*, and only voice data may be received. In this case, the first electronic device 110*a* may recognize that the user of the first electronic device 110*a* is having a video call with the counterpart user. In some example embodiments, if the counterpart user of the second electronic device 110*b* is displayed on the video call screen 510 of the first electronic device 110*a* and, at the same time, voice data is received while viewing a face of the counterpart user, the first electronic device 110*a* may recognize that the user of the first electronic device 110*a* is having a video call with the counterpart user.

Referring to (c) of FIG. 7, the first electronic device 110*a* may determine whether reaction information of the counterpart user of the second electronic device 110*b* is recognized by transmitting and receiving text data to and from the counterpart user during a video call. An available messenger service may be provided during the video call between the first electronic device 110*a* and the second electronic device 110*b*. Also, a user interface of inputting a message may be provided and the user of the first electronic device 110*a* and the counterpart user of the second electronic device 110*b* may have a conversation by transmitting and receiving messages through the provided user interface. The first electronic device 110*a* may recognize that the user of the first electronic device 110*a* is having a video call with the counterpart user by receiving text data input from the second electronic device 110*b*.

Also, the first electronic device 110*a* may determine whether reaction information of the second electronic device 110*b* is present based on at least one of facial information of the counterpart user, voice information of the counterpart user, and text information of the counterpart user. Here, order for determine whether reaction information of the counterpart user is present may be set and reaction information of the second electronic device 110*b* may be recognized based on the set order.

Figure 8:
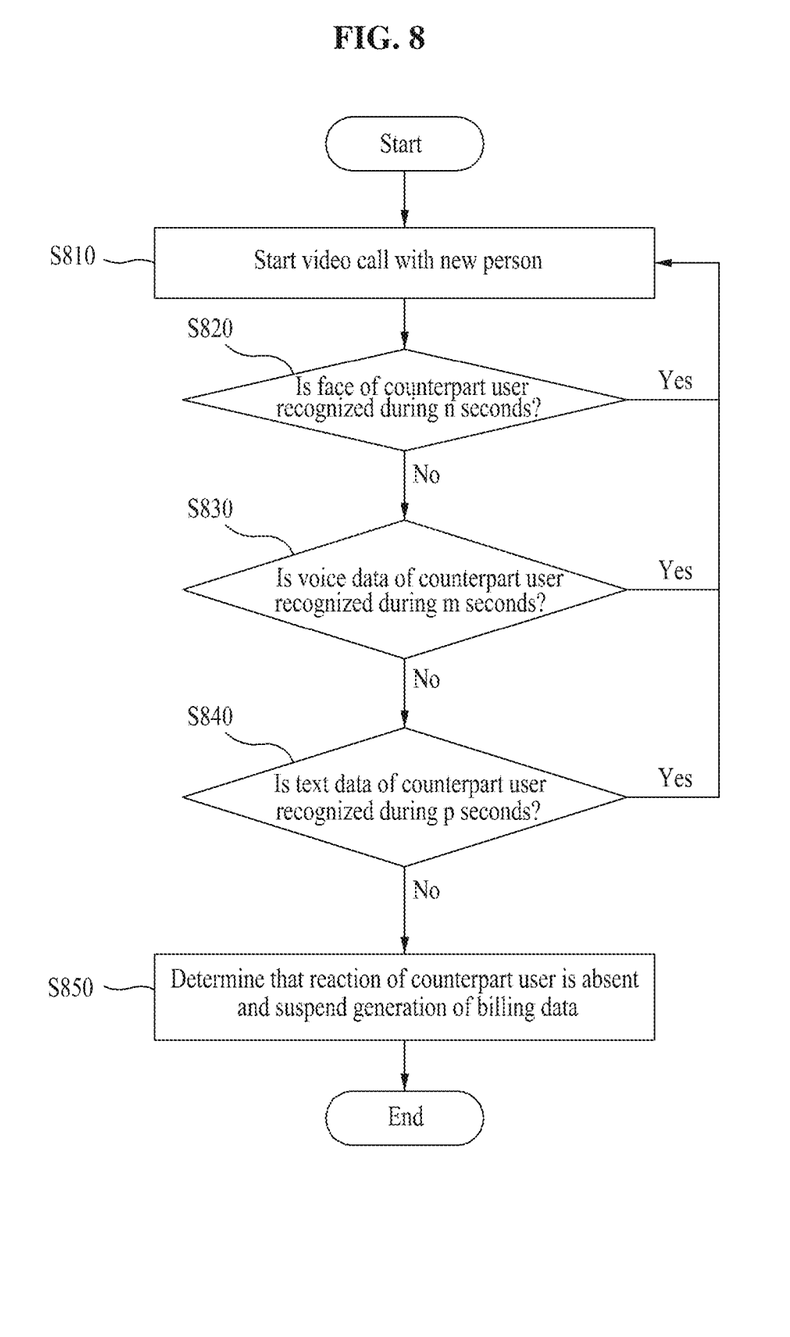
FIG. 8 is a flowchart illustrating an example of generating billing data based on reaction information of a counterpart terminal at an electronic device according to at least one example embodiment.

FIG. 8 is a flowchart illustrating an example of generating billing data based on reaction information of a counterpart terminal at an electronic device according to at least one example embodiment.

Hereinafter, the flowchart of FIG. 8 is described by classifying electronic devices into a terminal and a counterpart terminal.

Referring to FIG. 8, in operation S810, the terminal may connect a video call with a new person, that is, the counterpart terminal. For example, the terminal may start a video call with a new person randomly selected from a server. Here, a duration of time during which the video call with the new person is connected may be set, and if the set duration of time elapses, a video call with another new person may be connected.

In operation S820, the terminal may determine whether a face of the counterpart user is recognized during n seconds based on video data related to the counterpart terminal displayed on a video call screen. Here, n denotes a natural number. If the face of the counterpart user is recognized, the terminal may start a call with a new person after the preset (or alternatively, desired) duration of time. Also, if the face of the counterpart user is not recognized, the terminal may recognize voice data of the counterpart user.

In operation S830, the terminal may determine whether voice data is recognized during m seconds in response to the face of the counterpart user being unrecognized from the video data related to the counterpart terminal displayed on the video call screen. Here, m denotes a natural number. If the voice data of the counterpart user is not recognized, the terminal may recognize text data input from the counterpart user. If the voice data of the counterpart user is recognized, the terminal may start a video call with a new person after the preset (or alternatively, desired) duration of time.

In operation S840, the terminal may determine whether an input of text data is recognized during p seconds in response to the voice data of the counterpart user being unrecognized from the video data related to the counterpart terminal displayed on the video call screen. Here, p denotes a natural number. The terminal may display a user interface for a message on the video call screen and may recognize the message that is input through the provided user interface. The terminal may start a video call with a new person after the preset (or alternatively, desired) duration of time in response to an input of the message from the counterpart terminal being recognized on the video call screen. If the input of the message from the counterpart terminal is not recognized on the video call screen, the terminal may determine that a reaction of the counterpart user is absent and may suspend generation of billing data in operation S850. Here, the billing data may refer to an amount used in the duration of time of the video call. Through operations S810 to S840, the terminal may determine that the reaction of the counterpart user is absent, and accordingly suspend generation of the billing data. With respect to the generated or suspended billing data, an amount used in the duration of time of the video call may be calculated by the server based on fee information set per unit time for the duration of time of the video call.

According to an example embodiment, order information for recognizing reaction information of the counterpart user may be set. For example, although order is set such that the terminal may recognize reaction information of the counterpart user in order of facial information, voice information, and text information of the counterpart user, the order information may be modified. Additionally, a duration of time (e.g., n seconds, m seconds, and p seconds) set to recognize reaction information of the counterpart user may vary. For example, a duration of time set to recognize facial information of the counterpart user may be less than or greater than a duration of time set to recognize voice data and text data of the counterpart user.

As another example, in response to a connection of a video call between the terminal and the counterpart terminal, a video call mode may operate. Based on the video call mode that operates in the terminal, video data related to the counterpart terminal may be displayed on the video call screen. If the video call mode is switched to a voice mode, the terminal may terminate the video call screen, and may suspend generation of billing data based on time information about a time at which the video call mode is switched to the voice mode. Here, the video call mode may refer to a mode for having a call while a camera of an electronic device operates and displays an image (e.g., a face) related to the counterpart terminal. In some example embodiments, in response to an operation of the video call mode, the electronic device may switch to a front camera mode for executing a front camera of the electronic device or a rear camera mode for executing a rear camera of the electronic device. Also, the voice mode may refer to a mode for having a general call. That is, if one of the terminal and the counterpart terminal switches to the voice mode, the face of the user may not be recognized, and accordingly the terminal may determine that the video call is terminated or suspended and may suspend generation of billing data.

According to the example embodiments disclosed herein, generation of the billing data related to a duration of time may be suspended or prevented if reaction information of a counterpart user of a counterpart terminal is not recognized during the duration of time, which is an additional time set by the user by using an item on a video call screen of a user terminal. Thus, the disclosed methods and/or systems use less computing resources and consume less power for generating the billing data.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular. However, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes, optical media such as CD-ROM and DVDs, magneto-optical media such as floptical disks, and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A computer-implemented billing method comprising:
    displaying, on a video call screen, video data related to a counterpart terminal with which a video call is connected;
    recognizing reaction information input from the counterpart terminal based on the video data related to the counterpart terminal displayed on the video call screen; and
    generating billing data related to the recognized reaction information of the counterpart terminal based on a billing policy,
    wherein the generating the billing data comprises setting the billing policy for assigning the billing data based on the reaction information of the counterpart terminal, and
    wherein the generating the billing data further comprises suspending generation of the billing data that is assigned based on the billing policy, in response to absence of the reaction information input from the counterpart terminal or in response to the reaction information being recognized for less than a duration of time, and
    wherein the generating the billing data further comprises, determining that the reaction information of the counterpart terminal is not recognized, and suspending generation of the billing data, in response to reaction information of a user of a terminal displayed on the video call screen being recognized and the reaction information of the counterpart terminal displayed on the video call screen being not recognized.

2. The method of claim 1, wherein the generating the billing data comprises counting a duration of time during which the reaction information of the counterpart terminal is recognized, and generating or suspending generation of the billing data related to the counted duration of time based on the billing policy.

3. The method of claim 1, wherein the recognizing comprises determining whether the reaction information of the counterpart terminal is recognized based on at least one of facial information of a counterpart user, voice data of the counterpart user, and text data of the counterpart user recognized from the video data related to the counterpart terminal displayed on the video call screen.

4. The method of claim 3, wherein the recognizing comprises performing a voice recognition for the voice data of the counterpart user in response to a facial recognition being absent in the facial information of the counterpart user during a first duration of time, performing a text input recognition for the text data of the counterpart user in response to the voice recognition being absent in the voice data of the counterpart user during a second duration of time, and determining that the reaction information of the counterpart terminal is absent in response to the text input recognition being absent in the text data of the counterpart user during a third duration of time.

5. The method of claim 3, wherein the recognizing comprises determining that reaction information to the facial information of the counterpart user is recognized based on ratio information of area information that includes components constituting the facial information of the counterpart user.

6. The method of claim 3, wherein the recognizing comprises:
    identifying the voice data of the counterpart user from voice data occurring during the video call; and
    recognizing that reaction information to the voice data of the counterpart user is input based on results of the identifying.

7. The method of claim 3, wherein the recognizing comprises:
    displaying a user interface of inputting a message on the video call screen; and
    recognizing that the text data of the counterpart user is input based on the message input through the user interface.

8. The method of claim 1, wherein the displaying comprises displaying, on the video call screen, the video data related to the counterpart terminal with which the video call is connected during a desired duration of time, in response to a connection of the video call with the counterpart terminal being retrieved in response to a request for connecting the video call.

9. The method of claim 1, wherein the displaying comprises controlling a duration of time of the video call with the counterpart terminal using an item during the video call in response to verifying a counterpart user of the counterpart terminal connected through the video call.

10. The method of claim 1, wherein the generating comprises counting an actual talk time during which the video call with the counterpart terminal is connected based on result information, which has been acquired by performing a recognition of the reaction information of the counterpart terminal during an additional time of the video call set by using an item on the video call screen.

11. The method of claim 1, wherein the displaying comprises:
   operating a video call mode in response to a connection of the video call with the counterpart terminal; and
   displaying the video data related to the counterpart terminal on the video call screen based on the video call mode.

12. The method of claim 1, wherein the generating comprises:
   terminating the video call screen in response to the video call mode that operates in response to a connection of the video call with the counterpart terminal is switched to a voice mode; and
   suspending generation of the billing data based on time information about a time at which the video call mode is switched to the voice mode.

13. A non-transitory computer-readable record medium storing instructions that, when executed by a processor, cause the processor to perform the billing method of claim 1.

14. A computer-implemented billing system comprising:
   a memory configured to store computer-readable instructions; and
   one or more processors configured to execute the computer-readable instructions such that the one or more processors are configured to,
      display, on a video call screen, video data related to a counterpart terminal with which a video call is connected;
      recognize reaction information input from the counterpart terminal based on the video data related to the counterpart terminal displayed on the video call screen; and
      generate billing data related to the recognized reaction information of the counterpart terminal based on a billing policy,
   wherein the one or more processors are further configured to generate the billing data by setting the billing policy for assigning the billing data based on the reaction information of the counterpart terminal,
   wherein the one or more processors are further configured to generate the billing data by suspending generation of the billing data that is assigned based on the billing policy, in response to absence of the reaction information input from the counterpart terminal or in response to the reaction information being recognized for less than a duration of time, and
   wherein the one or more processors are further configured to generate the billing data by
      determining that the reaction information of the counterpart terminal is not recognized, and
      suspending generation of the billing data, in response to reaction information of a user of a terminal displayed on the video call screen being recognized and the reaction information of the counterpart terminal displayed on the video call screen being not recognized.

15. The billing system of claim 14, wherein the one or more processors are further configured to determine whether the reaction information of the counterpart terminal is recognized based on at least one of facial information of a counterpart user, voice data of the counterpart user, and text data of the counterpart user recognized from the video data related to the counterpart terminal displayed on the video call screen.

16. The billing system of claim 14, wherein the one or more processors are further configured to
   control a duration of time of the video call with the counterpart terminal using an item during the video call in response to verifying a counterpart user of the counterpart terminal connected through the video call, and
   count an actual talk time during which the video call with the counterpart terminal is connected based on result information, which has been acquired by performing a recognition of the reaction information of the counterpart terminal during an additional time of the video call set by using the item on the video call screen.

* * * * *